US009805307B2

(12) United States Patent
Kang et al.

(10) Patent No.: US 9,805,307 B2
(45) Date of Patent: Oct. 31, 2017

(54) DETERMINING SOFT GRAPH CORRESPONDENCE BETWEEN NODE SETS BASED ON FEATURE REPRESENTATIONS

(71) Applicant: International Business Machines Corporation, Armonk, NY (US)

(72) Inventors: U Kang, Pittsburgh, PA (US); Ravindranath Konuru, Tarrytown, NY (US); Jimeng Sun, White Plains, NY (US); Hanghang Tong, Ossining, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 475 days.

(21) Appl. No.: 13/744,045

(22) Filed: Jan. 17, 2013

(65) Prior Publication Data
US 2014/0025617 A1 Jan. 23, 2014

Related U.S. Application Data

(60) Provisional application No. 61/637,378, filed on Apr. 24, 2012.

(51) Int. Cl.
*G06N 5/04* (2006.01)
*G06F 17/30* (2006.01)
*G06N 5/02* (2006.01)

(52) U.S. Cl.
CPC ........... *G06N 5/04* (2013.01); *G06F 17/3053* (2013.01); *G06N 5/02* (2013.01)

(58) Field of Classification Search
None
See application file for complete search history.

(56) References Cited

U.S. PATENT DOCUMENTS

| 7,587,307 | B2 | 9/2009 | Cancedda et al. |
| 8,175,412 | B2 | 5/2012 | Basri et al. |
| 2007/0255671 | A1* | 11/2007 | Fox ...................... G06N 3/0427 706/54 |
| 2009/0234869 | A1 | 9/2009 | Azvine et al. |
| 2010/0238176 | A1 | 9/2010 | Guo et al. |

FOREIGN PATENT DOCUMENTS

| CN | 1477600 | 2/2004 |
| JP | 02007317070 | 12/2007 |

OTHER PUBLICATIONS

Nikolic. Measuring Similarity of Graphs and their Nodes by Neighbor Matching. 15 pages, Sep. 2010.*
Kang et alia. GBASE: A Scalable and General Graph Management System. KDD'11, Aug. 21-24, 2011.*
(Continued)

*Primary Examiner* — Lut Wong
*Assistant Examiner* — Robert Bejcek, II
(74) *Attorney, Agent, or Firm* — Daniel P. Morris; Otterstedt, Ellenbogen & Krammer, LLP (57) ABSTRACT

A method for determining a correspondence between a first node set of a first graph and a second node set of a second graph includes building a feature representation for each of the first graph and the second graph, and inferring the correspondence between the first node set and the second node set based on the feature representations.

6 Claims, 9 Drawing Sheets

(56) References Cited

OTHER PUBLICATIONS

Rowe. Interlinking Distributed Social Graphs. Proceedings of Linked Data on the Web Workshop, World Wide Web Conference 2009. 2009.*

Emmert-Streib. The Chronic Fatigue Syndrome: A Comparative Pathway Analysis. Journal of Computational Biology, vol. 14, No. 7, 2007.*

Sadun. Applied Linear Algebra: The Decoupling Principle, Chapter 1. 2008.*

Zhang. Solving Large Scale Linear Prediction Problems Using Stochastic Gradient Descent Algorithms. Proceedings of the 21st International Conference on Machine Learning. 2004.*

Macindoe et alia. Graph Comparison Using Fine Structure Analysis. IEEE Second International Conference on Social Computing (SocialCom), 2010.*

Yan et alia. Substructure Similarity Search in Graph Database. SIGMOD 2005.*

Salim Jouili, Salvatore Tabbone. Graph Matching Based on Node Signatures. A. Torsello, F. Escolano, and L. Brun. 7th IAPR-TC-15 Workshop on Graph-based Representations in Pattern Recognition—GbRPR 2009, May 2009, Venise, Italy. Springer, 5534, pp. 154-163, 2009, Lecture Notes in Computer Science; Graph-Based Representations in Pattern Recognition.*

Li et al. Graph Classification via Topological and Label Attributes. MLG '11 San Diego, CA, USA. pp. 9. 2011.*

Koutra et al. Algorithms for Graph Similarity and Subgraph Matching. 2011.*

Chua et al. Candidate Reduction and Alignment Improvement Techniques Used in Aligning Ontologies. iiWAS2009 Dec. 14-16, 2009, Kuala Lumpur, Malaysia. pp. 72-79.*

Marwan Torki et al., "Learning a Joint Manifold Representation from Multiple Data Sets", pp. 1068-1071 Proc. of the 2010 20th ICPR, May 2010.

Bo Long et al., "Combining Multiple Clusterings by Soft Correspondence", pp. 1-8, In Proc. of ICDM' Nov. 2005.

Ruan et al., Efficient Community Detection in Large Networks using Content and Links, WWW '13 Proceedings of the 22nd international conference on World Wide Web, May 2013, pp. 1089-1098, Rio de Janeiro, Brazil.

* cited by examiner

| CASE | NORMALIZATION OF W | # OF NODE LABELS | EXACT | ARK |
|---|---|---|---|---|
| (a) | NORMALIZED | 1 | $O(n^3)$ | $O(n^2 r^4 + r^6 + mr)$ |
| (b) | UNNORMALIZED | 1 | $O(n^3)$ | $O((m+n)r + r^2)$ |
| (c) | NORMALIZED | $d_n$ | $O(m^2 i_F)$ | $O(d_n n^2 r^4 + r^6 + mr)$ |
| (d) | UNNORMALIZED | $d_n$ | $O(m^2 i_F)$ | $O(d_n n^2 r^4 + r^6 + mr)$ |

FIG. 4

Algorithm 1 ARK-U: approximate random walk kernel for unlabeled nodes and asymmetric $W$

Input: Adjacency matrix $A_1$ of a graph $G_1$,
  adjacency matrix $A_2$ of a graph $G_2$,
  starting and ending probability $p_1$ and $q_1$ for $G_1$,
  starting and ending probability $p_2$ and $q_2$ for $G_2$,
  decay factor $c$.

Output: Approx. random walk kernel $\hat{k}(G_1, G_2)$

1: $W_1 \leftarrow A_1 D_1^{-1}$; // row normalize $A_1$
2: $W_2 \leftarrow A_2 D_2^{-1}$; // row normalize $A_2$
3: $U_1 \Lambda_1 V_1^T \leftarrow W_1^T$; //SVD on $W_1^T$
4: $U_2 \Lambda_2 V_2^T \leftarrow W_2^T$; //SVD on $W_2^T$
5: $\tilde{\Lambda} \leftarrow ((\Lambda_1 \otimes \Lambda_2)^{-1} - c(V_1^T \otimes V_2^T)(U_1 \otimes U_2))^{-1}$;
6: $L \leftarrow (q_1^T U_1 \otimes q_2^T U_2)$;
7: $R \leftarrow (V_1^T p_1 \otimes V_2^T p_2)$;
8: $\hat{k}(G_1, G_2) \leftarrow (q_1^T p_1)(q_2^T p_2) + cL\tilde{\Lambda}R$;

FIG. 5

Algorithm 2 ARK-U+: approximate random walk kernel for unlabeled nodes and symmetric $W$

Input: Adjacency matrix $A_1$ of a graph $G_1$,
    adjacency matrix $A_2$ of a graph $G_2$,
    starting and ending probability $p_1$ and $q_1$ for $G_1$,
    starting and ending probability $p_2$ and $q_2$ for $G_2$,
    decay factor $c$.

Output: Approx. random walk kernel $\hat{k}(G_1, G_2)$

1: $U_1 \Lambda_1 U_1^T \leftarrow A_1^T$;  //eigen decomposition on $W_1$
2: $U_2 \Lambda_2 U_2^T \leftarrow A_2^T$;  //eigen decomposition on $W_2$
3: $\tilde{\Lambda} \leftarrow ((\Lambda_1 \otimes \Lambda_2)^{-1} - cI)^{-1}$;
4: $L \leftarrow (q_1^T U_1 \otimes q_2^T U_2)$;
5: $R \leftarrow (U_1^T p_1 \otimes U_2^T p_2)$;
6: $\hat{k}(G_1, G_2) \leftarrow (q_1^T p_1)(q_2^T p_2) + cL\tilde{\Lambda}R$;

FIG. 6

Algorithm 3 ARK-L: approximate random walk kernel for labeled nodes

Input: Weight matrix $W_1$ of a graph $G_1$,
    weight matrix $W_2$ of a graph $G_2$,
    label matrices $L_1^{(1)}$ to $L_1^{(d_n)}$ of $G_1$,
    label matrices $L_2^{(1)}$ to $L_2^{(d_n)}$ of $G_2$,
    starting and ending probability $p_1$ and $q_1$ for $G_1$,
    starting and ending probability $p_2$ and $q_2$ for $G_2$,
    decay factor $c$.

Output: Approx. random walk kernel $\hat{k}(G_1, G_2)$

1: $U_1 \Lambda_1 V_1^T \leftarrow W_1^T$;  //SVD on $W_1^T$
2: $U_2 \Lambda_2 V_2^T \leftarrow W_2^T$;  //SVD on $W_2^T$
3: $\tilde{\Lambda} \leftarrow ((\Lambda_1 \otimes \Lambda_2)^{-1} - c(\sum_{j=1}^{d_n} V_1^T L_1^{(j)} U_1 \otimes V_2^T L_2^{(j)} U_2))^{-1}$;
4: $L \leftarrow (\sum_{j=1}^{d_n} q_1^T L_1^{(j)} U_1 \otimes q_2^T L_2^{(j)} U_2)$;
5: $R \leftarrow (\sum_{j=1}^{d_n} V_1^T L_1^{(j)} p_1 \otimes V_2^T L_2^{(j)} p_2)$;
6: $\hat{k}(G_1, G_2) \leftarrow (\sum_{j=1}^{d_n} (q_1^T L_1^{(j)} p_1)(q_2^T L_2^{(j)} p_2)) + cL\tilde{\Lambda}R$;

(d) HEP-TH : UNLABELED, ASYMMETRIC

(e) HEP-TH : UNLABELED, SYMMETRIC (f) HEP-TH : LABELED

| NODES | WWW | | | HEP-TH | | | OREGON | | |
|---|---|---|---|---|---|---|---|---|---|
| | ARK-U | ARK-U+ | ARK-L | ARK-U | ARK-U+ | ARK-L | ARK-U | ARK-U+ | ARK-L |
| 100 | 0.959 | 0.999 | 0.980 | 0.999 | 0.999 | 0.999 | 0.998 | 0.999 | 0.999 |
| 500 | 0.957 | 0.999 | 0.984 | 0.977 | 0.999 | 0.995 | 0.959 | 0.999 | 0.980 |
| 1000 | 0.930 | 0.999 | * | 0.962 | 0.999 | * | 0.939 | 0.999 | * |
| 1500 | 0.920 | 0.999 | * | 0.952 | 0.999 | * | 0.934 | 0.999 | * |
| 2000 | 0.913 | 0.999 | * | 0.946 | 0.998 | * | 0.928 | 0.999 | * |

FIG. 9

| r* | WWW | | | HEP-TH | | | OREGON | | |
|---|---|---|---|---|---|---|---|---|---|
| | ARK-U | ARK-U+ | ARK-L | ARK-U | ARK-U+ | ARK-L | ARK-U | ARK-U+ | ARK-L |
| 1 | 0.930 | 0.993 | 0.971 | 0.977 | 0.999 | 0.996 | 0.943 | 0.999 | 0.970 |
| 2 | 0.930 | 0.999 | 0.971 | 0.977 | 0.999 | 0.996 | 0.947 | 0.999 | 0.974 |
| 3 | 0.950 | 0.999 | 0.981 | 0.977 | 0.999 | 0.996 | 0.950 | 0.999 | 0.975 |
| 4 | 0.951 | 0.999 | 0.981 | 0.977 | 0.999 | 0.996 | 0.952 | 0.999 | 0.976 |
| 5 | 0.953 | 0.999 | 0.982 | 0.977 | 0.999 | 0.995 | 0.954 | 0.999 | 0.977 |
| 6 | 0.957 | 0.999 | 0.984 | 0.977 | 0.999 | 0.995 | 0.959 | 0.999 | 0.980 |
| 7 | 0.961 | 0.999 | 0.986 | 0.977 | 0.999 | 0.995 | 0.961 | 0.999 | 0.981 |
| 8 | 0.962 | 0.999 | 0.987 | 0.977 | 0.999 | 0.995 | 0.961 | 0.999 | 0.981 |
| 9 | 0.962 | 0.999 | 0.987 | 0.977 | 0.999 | 0.995 | 0.964 | 0.999 | 0.983 |
| 10 | 0.963 | 0.999 | 0.987 | 0.977 | 0.999 | 0.994 | 0.966 | 0.999 | 0.984 |
| 11 | 0.965 | 0.999 | 0.989 | 0.977 | 0.999 | 0.994 | 0.967 | 0.999 | 0.984 |
| 12 | 0.966 | 0.999 | 0.989 | 0.977 | 0.999 | 0.994 | 0.968 | 0.999 | 0.985 |
| 13 | 0.967 | 0.999 | 0.989 | 0.977 | 0.999 | 0.994 | 0.969 | 0.999 | 0.986 |
| 14 | 0.969 | 0.999 | 0.991 | 0.977 | 0.999 | 0.994 | 0.970 | 0.999 | 0.986 |
| 15 | 0.971 | 0.999 | 0.991 | 0.977 | 0.999 | 0.994 | 0.971 | 0.999 | 0.986 |
| 16 | 0.971 | 0.999 | 0.991 | 0.977 | 0.999 | 0.994 | 0.972 | 0.999 | 0.987 |
| 17 | 0.972 | 0.999 | 0.992 | 0.977 | 0.999 | 0.993 | 0.974 | 0.999 | 0.988 |
| 18 | 0.972 | 0.999 | 0.992 | 0.977 | 0.999 | 0.993 | 0.976 | 0.999 | 0.989 |
| 19 | 0.972 | 0.999 | 0.992 | 0.977 | 0.999 | 0.993 | 0.977 | 0.999 | 0.989 |
| 20 | 0.973 | 0.999 | 0.992 | 0.977 | 0.999 | 0.993 | 0.977 | 0.999 | 0.990 |

FIG. 10

DETERMINING SOFT GRAPH CORRESPONDENCE BETWEEN NODE SETS BASED ON FEATURE REPRESENTATIONS

CROSS REFERENCE TO RELATED APPLICATION

This application claims priority to U.S. Provisional Patent Application Ser. No. 61/637,378, filed Apr. 24, 2012, the contents of which are hereby incorporated by reference in their entirety.

This invention was made with Government support under Contract No.: W911NF-11-C-0200 (Defense Advanced Research Projects Agency (DARPA)). The Government has certain rights in this invention.

BACKGROUND

The present disclosure relates generally to determining similarities between graphs, and more particularly, to building soft correspondence between node sets of respective input graphs.

Many real-world, complex objects with structural properties can be modeled as graphs. For example, the World Wide Web can be represented as a graph with web-pages as nodes and hyperlinks as edges. In another example, a patient's medical data can be modeled as a symptom-lab test graph, which can be constructed from his/her medical records, providing an indicator of the structure information of possible disease s/he carries (e.g., the association between a particular symptom and some lab test, the co-occurrence of different symptom).

Random walk graph kernel has been used as a tool for various data mining tasks including classification and similarity computation. Despite its usefulness, however, it suffers from its expensive computational costs which are at least $O(n^3)$ or $O(m^2)$ for graphs with n nodes and m edges.

BRIEF SUMMARY

According to an embodiment of the present disclosure, a method for determining a soft correspondence between a first node set of a first graph and a second node of a second graph includes building a feature representation for each of the first graph and the second graph, and inferring the soft correspondence between the first node set and the second node set based on the feature representations.

According to an embodiment of the present disclosure, a method for finding a correspondence between a plurality of graphs includes converting the plurality of graphs into respective feature representations and decoupling a dependency between the plurality of graphs, and determining the correspondence between a plurality of features of the feature representations.

According to an embodiment of the present disclosure, a computer program product includes a computer usable medium having a computer readable program code embodied therein, said computer readable program code configured to be executed by a processor to implement a method for determining a correspondence between a first node set of a first graph and a second node of a second graph.

According to an embodiment of the present disclosure, a system for determining a correspondence between a first node set of a first graph and a second node of a second graph includes distinct software modules, and wherein the distinct software modules include a feature determination module and an inference module. The system can be configured to perform a method including building a feature representation for each of the first graph and the second graph, and wherein the building is performed by the feature determination module in response to being called by the processor, and inferring a correspondence between the first node set and the second node set based on the feature representations, wherein the inferring is performed by the inference module in response to being called by the processor.

BRIEF DESCRIPTION OF THE SEVERAL VIEWS OF THE DRAWINGS

Preferred embodiments of the present disclosure will be described below in more detail, with reference to the accompanying drawings:

FIG. 5 is an another exemplary algorithm for determining a kernel given two graphs according to an embodiment of the present disclosure;

FIG. 6 is an another exemplary algorithm for determining a kernel given two graphs according to an embodiment of the present disclosure;

FIG. 8 shows the accuracy of different exemplary methods according to an embodiment of the present disclosure;

FIG. 9 shows the accuracy of different exemplary methods according to an embodiment of the present disclosure.

DETAILED DESCRIPTION

Embodiments of the present disclosure relate to a method for determining a scalable random walker. More particularly, a method is described for determining an approximate random walk kernel (ARK).

Many real graphs have lower intrinsic ranks, compared with the size of the graphs. According to an exemplary embodiment of the present disclosure, an ARK method uses a set of methods to leverage low-rank structures as an intermediate operation, speeding the determination of the random walk graph kernel. More particularly, an ARK method exploits the low rank structures to determine random walk graph kernels in $O(n^2)$ or $O(m)$ time.

Herein, the following symbols are used:

| Symbol | Definition |
| --- | --- |
| G | a graph |
| n | number of nodes in a graph |
| m | number of edges in a graph |
| A | adjacency matrix of a graph |
| $k(G_1, G_2)$ | exact graph kernel function on graphs $G_1$ and $G_2$ |
| $\hat{k}(G_1, G_2)$ | approximate graph kernel function on graphs $G_1$ and $G_2$ |
| W | weight matrix in random walk kernel |
| c | decay factor in random walk kernel |
| $d_n$ | number of distinct node labels |
| r | reduced rank after low rank approximation |

Figure 1:
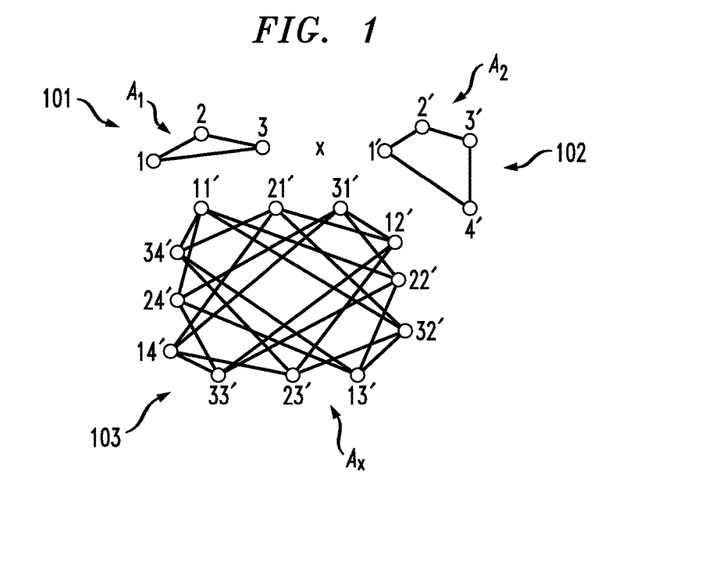
FIG. 1 is an illustration of the direct product of two graphs according to an embodiment of the present disclosure.

As described above, a random walk graph kernel can be used for classification and measuring similarities of graphs. Referring to FIG. 1, given two graphs $A_1$ and $A_2$ (101 and 102, respectively), the random walk graph kernel can be used to determine the number of common walks in two graphs, exemplified by the direct product $A_x$ (103). Two walks are common if the lengths of the walks are equal, and the label sequences are the same for nodes/edges in labeled graphs. The number of common walks is used to measure the similarity of two graphs.

Figure 2A:
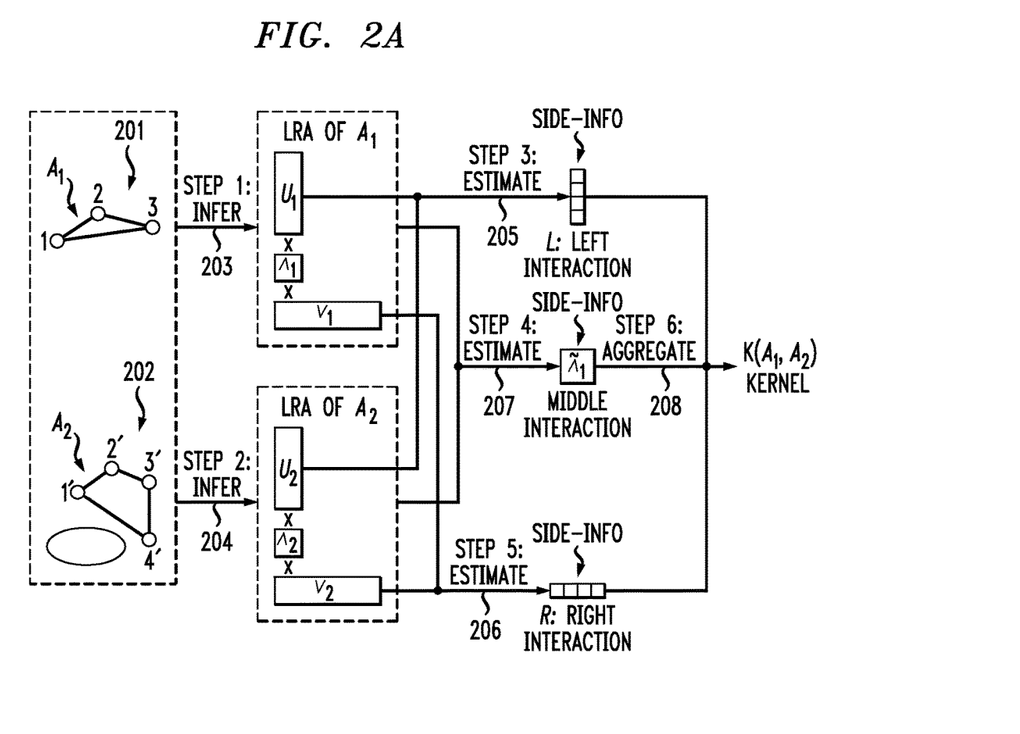
FIG. 2A shows an exemplary method for determining a kernel according to an embodiment of the present disclosure.

According to an exemplary embodiment of the present disclosure and referring to FIG. 2A, the kernel/similarity between two input graphs (201 and 202) can be determined by inferring a low-rank representation of a first graph at 203 (or low-rank approximation (LRA)), inferring a low-rank representation of a second graph at 204, estimating a left interaction between the first and second graphs using side information (e.g., starting vectors and stopping vectors of the respective graphs) at 205, estimating a right interaction between the first and second graphs using side information (e.g., starting vectors and stopping vectors of the respective graphs) at 206, estimating a middle interaction between the first and second graphs at 207, and aggregating the left, middle and right interactions and determining a similarity between the first and second graphs at 208.

The following will describe an exemplary embodiment in more detail.

According to an exemplary embodiment of the present disclosure, a random walk graph kernel for the unlabeled and unnormalized case can be derived. The random walk graph kernel can be generalized to labeled and normalized cases. Given two graphs $G_1=\{V_1, E_1\}$ and $G_2=\{V_2, E_2\}$, the direct product graph $G_x=\{V_x, E_x\}$ of $G_1$ and $G_2$ is a graph with the node set $V_x=\{(v_1, v_2)|v_1 \in V_1, v_2 \in V_2\}$, and the edge set $E_x=\{((v_{11}, v_{21}),(v_{12}, v_{22}))|(v_{11},v_{12})\in E_1,(v_{21},v_{22})\in E_2\}$. A random walk on the direct product graph $G_x$ can be said to be equivalent to the simultaneous random walks on $G_1$ and $G_2$. Let $p_1$ and $p_2$ be starting vectors of the random walks on $G_1$ and $G_2$, respectively. Stopping vectors $q_1$ and $q_2$ can be defined similarly. The number of length l common walks on the direct product graph $G_x$ can be given by $(q_1 \otimes q_2)(W_1^T \otimes W_2^T)^l(p_1 \otimes p_2)$, where $W_1$ and $W_2$ are the adjacency matrices of $G_1$ and $G_2$, respectively. Discounting the longer walks by the decay factor c, and summing up all the common walks for all different lengths, an exemplary random walk graph kernel can be expressed as:

$$k(G_1, G_2) = \sum_{l=0}^{\infty} (q_1 \otimes q_2)(W_1^T \otimes W_2^T)^l(p_1 \otimes p_2)$$

$$= (q_1 \otimes q_2)(I - c(W_1^T \otimes W_2^T))^{-1}(p_1 \otimes p_2).$$

More generally, the random walk graph kernel can be defined as follows.

Let $G_1$ and $G_2$ be two graphs. Let $p_1$ and $p_2$ be the starting vectors of the random walks on $G_1$ and $G_2$, respectively. The stopping probabilities $q_1$ and $q_2$ can be defined similarly. The random walk graph kernel $k(G_1, G_2)$ can be determined by:

$$k(G_1,G_2):=q^T(I-cW)^{-1}p, \qquad \text{Eq. (1)}$$

where W is a weight matrix, c is a decay factor, $p=p_1 \otimes p_2$, and $q=q_1 \otimes q_2$.

The weight matrix W can be determined by a normalization and labels on nodes/edges.

Referring to the normalization: Let $A_1$ and $A_2$ be the adjacency matrices of $G_1$ and $G_2$, respectively. For an unnormalized case, the weight matrix can be given by:

$$W=A_1^T \otimes A_2^T.$$

For a normalized case, the weight matrix can be given by:

$$W=A_1^T D_1^{-1} \otimes A_2^T D_2^{-1},$$

where $D_1$ and $D_2$ are diagonal matrices whose $i^{th}$ diagonal elements are given by $\Sigma_j A_1(i, j)$ and $\Sigma_j A_2(i, j)$, respectively.

Referring to labels: Nodes and edges can be labeled. Consider the case of node labeled graphs. Let $G_1$ have $n_1$ nodes and $G_2$ have $n_2$ nodes. Let $l_1$ and $l_2$ be the node label vectors of $G_1$ and $G_2$, respectively. The $((i-1)\cdot n_2+j)^{th}$ row of the weight matrix W are zeroed out if the $i^{th}$ element $l_1(i)$ of $l_1$ and the $j^{th}$ element $l_2(j)$ of $l_2$ do not have the same labels. Consider now edge labeled graphs. Let $W_1$ and $W_2$ be the normalized or unnormalized adjacency matrices of $G_1$ and $G_2$, respectively. The $((i_1-1)\cdot n_2+i_2,(j_1-1)\cdot n_2+j_2)^{th}$ element of W is 1 if and only if the edge labels of $W_1^T(i_1, j_1)$ and $W_2^T(i_2, j_2)$ are the same.

Referring now to various exemplary exact methods for determining a random walk graph kernel that follow, assume that both the graphs $G_1$ and $G_2$ have n nodes and m edges.

In a naive method the Equation (1) can be computed by inverting the $n^2 \times n^2$ matrix W. Since inverting a matrix takes time proportional to the cube of the number of rows/columns, the running time is $O(n^6)$.

In another example, if the weight matrix can be decomposed into one or two sums of Kronecker products, a Sylvester method can be used to solve the Equation (1) in $O(n^3)$ time. In the Sylvester method, the two graphs need to have the same number of nodes. Further, the theoretical running time of the Sylvester method on the weight matrix composed of more than two Kronecker products is unknown.

For unlabeled and unnormalized matrices, a spectral decomposition method runs in $O(n^3)$ time. The problem of spectral decomposition method is that it can't run on the labeled graph or normalized matrix.

In a further example, a conjugate gradient (CG) method can be used to solve linear systems. To use CG for determining random walk graph kernel, solve (I–cWx=p) for x using CG, and determine $q^T x$. Each iteration of CG takes $O(m^2)$ since the most expensive operation is the matrix-vector multiplication. Thus CG takes $O(m^2 i_F)$ time where $i_F$ denote the number of iterations. A problem of the CG method is its high memory requirement: it requires $O(m^2)$ memory.

In yet another example, a fixed point iteration method solves (I–cW)x=p for x by iterative matrix-vector multiplications. Similar to CG, the fixed point iteration method takes $O(m^2 i_F)$ time for $i_F$ iterations, and has the same problems of requiring $O(m^2)$ memory.

Figure 3:
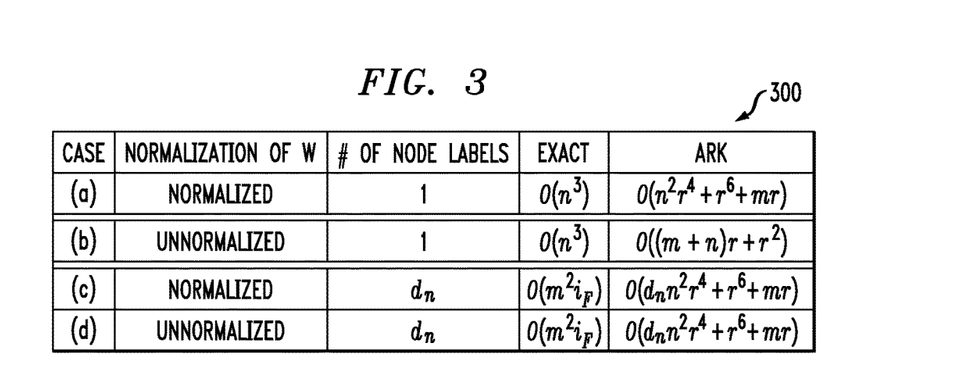
FIG. 3 shows a summary of running times for different methods according to an embodiment of the present disclosure.

According to an embodiment of the present disclosure, in an approximate random walk kernel (ARK) method, a set of approximation algorithms can be used to determine the random walk graph kernel. According to an embodiment of the present disclosure, approximations of the graph(s), along with a starting vector and a stopping vector for each graph, can be stored in less memory than the entire graph and may not suffer an 'out of memory' error, such as in a case where a graph is too large to be stored in a memory. FIG. 3 shows a summary 300 of the running time comparison of an ARK method and the exact algorithms. Unlabeled graphs correspond to the cases (a) and (b). Node labeled graphs correspond to the cases (c) and (d).

Referring to the unlabeled graphs and an asymmetric W (ARK-U, defined below), consider node unlabeled graphs with the normalized weight matrix, which correspond to the case (a) in FIG. 3. Let two graphs $G_1$ and $G_2$ have the adjacency matrices $A_1$ and $A_2$, respectively. Let $W_1 = A_1 D_1^{-1}$ and $W = A_2 D_2^{-1}$ be the row normalized adjacency matrix of $G_1$ and $G_2$, where $D_1$ and $D_2$ are diagonal matrices whose $i^{th}$ diagonal elements are given by $\Sigma_j A_1(i, j)$ and $\Sigma_j A_2(i, j)$, respectively. In this setting, the weight matrix W can be given by:

$$W = W_1^T \otimes W_2^T$$

Since the W matrix is large (e.g., including hundreds of nodes, thousands of nodes, etc.), W can be approximated using low-rank approximations. More precisely, the r-approximation of a matrix can be defined as follows.

Given a matrix A, the r-approximation of A is a matrix $\hat{A}$ satisfying the following equation:

$$\|A - \hat{A}\|_F \leq \min_{Z | rank(Z) = r} \|A - Z\|_F, \quad \text{Eq. (2)}$$

meaning that $\hat{A}$ provides a better approximation to A than the best rank-r approximation.

An approximate random walk kernel can be defined as follows.

Given a random walk graph kernel function $k(G_1, G_2) := q^T (I - cW)^{-1} p$, a approximate random walk graph kernel $\hat{k}(G_1, G_2)$ can be given by:

$$\hat{k}(G_1, G_2) := q^T (I - c\hat{W})^{-1} p$$

where $\hat{W}$ is a low rank approximation of W.

The $\hat{W}$ matrix needs to be as close as possible to W, while preserving a low rank. That is, $\hat{W}$ can be an r-approximation of W. It is well known that the singular value decomposition (SVD) gives a good (or best) low rank approximation. Thus, one approach to get the r-approximation of W is to use rank-r SVD of W. However, such a method has a running time $O(m^2 r)$, and the W matrix needs to be explicitly constructed.

Figure 4:
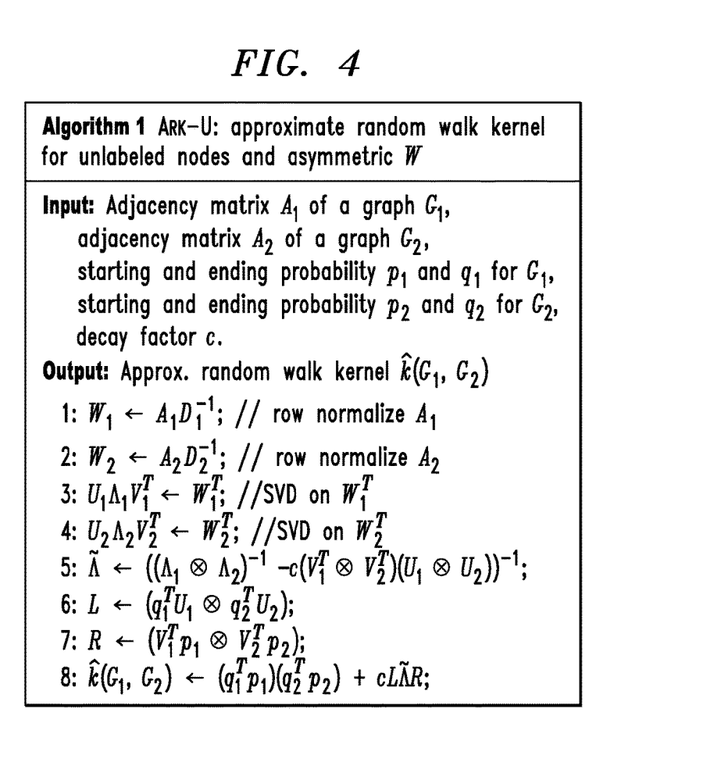
FIG. 4 is an exemplary algorithm for determining a kernel given two graphs according to an embodiment of the present disclosure.

According to an embodiment of the present disclosure, the SVD of $W_1^T$ and $W_2^T$ can be used to determine the r-approximation of the weight matrix W. This approach may not need to explicitly construct the W matrix. This method is referred to as Ark-U. Algorithm 1, shown in FIG. 4, gives an exemplary approximation method.

The Algorithm 1 for Ark-U gives the approximate random walk kernel:

$$\hat{k}(G_1, G_2) = q^T (I - c\hat{W})^{-1} p, \quad \text{Eq. (3)}$$

where $\hat{W}$ is the r-approximation of $W = W_1 \otimes W_2$.

As a proof of Algorithm 1: Let $W_1^T = U_1 \Lambda_1 V_1^T$ and $W_2^T = U_2 \Lambda_2 V_2^T$ be the top r singular value decompositions of $W_1^T$ and $W_2^T$. From the standard result of linear algebra, $$\hat{W} = (U_1 \otimes U_2)(\Lambda_1 \otimes \Lambda_2)(V_1^T \otimes V_2^T)$$

is a singular value decomposition. The $\hat{W}$ satisfies $\|W - \hat{W}\|_F \leq \min_{Z | rank(Z) = r} \|W - Z\|_F$ since the diagonal elements of the matrix $\Lambda_1 \otimes \Lambda_2$ contain top r largest eigenvalues of $W_1^T \otimes W_2^T$.

Thus, $$q^T(I-cW)^{-1}p = q^T(I - c(U_1 \otimes U_2)(\Lambda_1 \otimes \Lambda_2)(V_1^T \otimes V_2^T))^{-1}p$$
$$= q^T(I + c(U_1 \otimes U_2)\tilde{\Lambda}(V_1^T \otimes V_2^T))p$$
$$= q^T p + cq^T(U_1 \otimes U_2)\tilde{\Lambda}(V_1^T \otimes V_2^T)p$$
$$= (q_1^T p_1)(q_2^T p_2) + c(q_1^T U_1 \otimes q_2^T U_2)\tilde{\Lambda}(V_1^T p_1 \otimes V_2^T p_2),$$

where the second equality comes from the Sherman-Morrison Lemma.

Referring to the time and the space complexities of Algorithm 1, note that the time complexity $O(n^2 r^4 + mr + r^6)$ of Ark-U is smaller than the best exact algorithm's complexity $O(n^3)$ since $n \gg rn \gg r$ as shown in FIG. 3.

More particularly, the time complexity of Ark-U takes $O(n^2 r^4 + mr + r^6)$ time. Here, the top r decompositions in lines 2 and 4 cost $O(nr + r^4)$. Determining $\tilde{\Lambda}$ in line 5 takes $O(n^2 r^4 + mr + r^6)$. Determining lines 6, 7 and 8 takes $O(nr + r^4)$.

Further, the space complexity of Ark-U uses $O(m + n^2 r^2)$ space. Here, the storage of $W_1$ and $W_2$ use $O(m)$ space. The top r decompositions in lines 3 and 4 use $O(nr)$ space. Lines 5 to 8 use $O(n^2 r^2)$ space, thus making the total space complexity $O(m + n^2 r^2)$.

Ark-U can be used for both the symmetric and the asymmetric weight matrices. For symmetric weight matrix, Ark-U+ is another exemplary approximation algorithm. Ark-U+ handles the case (b) in FIG. 3.

To describe the weight matrix W in this setting, assume two graphs $G_1$ and $G_2$ have the symmetric adjacency matrices $A_1$ and $A_2$, respectively. Then, the weight matrix W can be given by:

$$W = A_1^T \otimes A_2^T, \quad \text{Eq. (4)}$$

where W is also symmetric by the nature of Kronecker products. According to an embodiment of the present disclosure, the eigen decomposition can be used to determine the r-approximation of W. Since the eigen decomposition and the SVD on symmetric matrices are different only up to signs, the eigen decomposition gives the correct r-approximation. Computationally, only one n×r eigenvectors needs to be stored, instead of two n×r singular vectors. Algorithm 2, shown in FIG. 5, gives an exemplary method for Ark-U+ for symmetric W.

More particularly, Ark-U+ gives the approximate random walk kernel:

$$\hat{k}(G_1, G_2) = q^T (I - c\hat{W})^{-1} p$$

where $\hat{W}$ is the r-approximation of $W = W_1 \otimes W_2$.

As a proof of Algorithm 2: Let $A_1^T = U_1 \Lambda_1 U_1^T$ and $A_2^T = U_2 \Lambda_2 U_2^T$ be the top r singular value decompositions of $A_1$ and $A_2$, respectively. From the standard result of linear algebra, $$\hat{W} = (U_1 \otimes U_2)(\Lambda_1 \otimes \Lambda_2)(U_1^T \otimes U_2^T), \quad \text{Eq. (5)}$$

is a singular value decomposition. The $\hat{W}$ satisfies $\|W - \hat{W}\|_F \leq \min_{Z | rank(Z) = r} \|W - Z\|_F$ since the diagonal elements of the matrix $\Lambda_1 \otimes \Lambda_2$ contain top r largest eigenvalues of $A_1^T \otimes A_2^T$.

Thus, $$q^T(I-cW)^{-1}p = q^T(I - c(U_1 \otimes U_2)(\Lambda_1 \otimes \Lambda_2)(U_1^T \otimes U_2^T))^{-1}p$$
$$= q^T(I + c(U_1 \otimes U_2)\tilde{\Lambda}(U_1^T \otimes U_2^T))p$$
$$= q^T p + cq^T(U_1 \otimes U_2)\tilde{\Lambda}(U_1^T \otimes U_2^T)p$$
$$= (q_1^T p_1)(q_2^T p_2) + c(q_1^T U_1 \otimes q_2^T U_2)\tilde{\Lambda}(U_1^T p_1 \otimes U_2^T p_2),$$

where the second equality comes from the Sherman-Morrison Lemma.

Referring to the time and the space complexities of Algorithm 2, note that the time and the space complexity of Ark-U+ is smaller than those of Ark-U due to the exploitation of the symmetricity.

More particularly, the time complexity of Ark-U+ takes $O((m+n)+r+r^2)$ time. Here, the top r decompositions in lines 1 and 2 cost $O(mr)$. Computing $\tilde{\Lambda}$ in line 3 takes $O(r^2)$. Computing line 4, 5 and 6 takes $O(nr+r^2)$.

The space complexity of Ark-U+ uses $O(m+nr+r^2)$ space. Here, the storage of $W_1$ and $W_2$ uses $O(m)$ space. The top r decompositions in lines 3 and 4 uses $O(nr)$. Lines 5 to 8 use $O(nr+r^2)$ space, thus making the total space complexity $O(m+nr+r^2)$.

In Ark-U+, the difference of the exact and the approximate random walk kernel (e.g., how close is the approximate random walk kernel $\hat{k}(G_1, G_2)$ to the exact kernel $k(G_1, G_2)$) can be considered to be bounded by:

$$|k(G_1, G_2) - \hat{k}(G_1, G_2)| \leq \sum_{(i,j) \notin F} \left| \frac{c\lambda_1^{(i)}\lambda_2^{(j)}}{1 - c\lambda_1^{(i)}\lambda_2^{(j)}} \right|, \quad \text{Eq. (6)}$$

where $\lambda_1^{(i)}$ and $\lambda_2^{(i)}$ are the $i^{th}$ largest eigenvalue of $\Lambda_1$ and $\Lambda_2$, respectively, and $F=\{(a,b)|a,b\in[1,k]\}$ is the set of pairs (a,b) where both a and b are in the range of [1,k].

As a proof of the error bound: Let $W=A_1^T \otimes A_2^T$. Then, $(U_1 \otimes U_2)(\Lambda_1 \otimes \Lambda_2)(U_1^T \otimes U_2^T)$ is an eigen decomposition of W, which includes top k largest eigenvalues of W. Let $u_1^{(i)}$ and $u_2^{(i)}$ be the $i^{th}$ column of $U_1$ and $U_2$, respectively. Then, $\tilde{u}^{(i,j)} := u_1^{(i)} \otimes u_2^{(j)}$ is the eigenvector of W with the corresponding eigenvalue $\lambda_1^{(i)}\lambda_2^{(j)}$. It follows that:

$$(I-cW)^{-1} = I + c(U_1 \otimes U_2)\tilde{\Lambda}(U_1^T \otimes U_2^T)$$
$$= I + \sum_{i,j \in [1,n]} \tilde{\lambda}^{(i,j)} \tilde{u}^{(i,j)}(\tilde{u}^{(i,j)})^T,$$

where $\tilde{\Lambda} \approx ((\Lambda_1 \otimes \Lambda_2)^{-1} - cI)^{-1}$, and $\tilde{\lambda}^{(i,j)} \approx \frac{c\lambda_1^{(i)}\lambda_2^{(j)}}{1 - c\lambda_1^{(i)}\lambda_2^{(j)}}$.

Now, consider an exemplary approximation: Let $\hat{W}$ be the W matrix from top k low rank approximations of $W_1$ and $W_2$, as shown in Equation (3.8). Then, $$(I - c\hat{W})^{-1} = I + \sum_{i,j \in [1,k]} \tilde{\lambda}^{(i,j)} \tilde{u}^{(i,j)}(\tilde{u}^{(i,j)})^T.$$

Thus, $$|k(G_1, G_2) - \hat{k}(G_1, G_2)| = |q^T(I - cW)^{-1}p - q^T(I - c\hat{W})^{-1}p|$$
$$= \left| q^T \left( \sum_{(i,j) \notin F} \frac{c\lambda_1^{(i)}\lambda_2^{(j)}}{1 - c\lambda_1^{(i)}\lambda_2^{(j)}} \tilde{u}^{(i,j)}(\tilde{u}^{(i,j)})^T \right) p \right|$$
$$\leq \|q^T\|_2 \cdot \left\| \sum_{(i,j) \notin F} \frac{c\lambda_1^{(i)}\lambda_2^{(j)}}{1 - c\lambda_1^{(i)}\lambda_2^{(j)}} \tilde{u}^{(i,j)}(\tilde{u}^{(i,j)})^T \right\|_F \cdot \|p\|_2$$
$$\leq \sum_{(i,j) \notin F} \left| \frac{c\lambda_1^{(i)}\lambda_2^{(j)}}{1 - c\lambda_1^{(i)}\lambda_2^{(j)}} \right|,$$

where the last inequality uses:

$\|q^T\|_2 \leq \|q^T\|_1 = 1$, $\|p\|_2 \leq \|p\|_1 = 1$, and $\|\Sigma_i a_i u_i u_i^T\|_F = \sqrt{tr(\Sigma_i a_i^2 u_i u_i^T)} = \sqrt{\Sigma_i a_i^2 \cdot tr(u_i u_i^T)} = \sqrt{\Sigma_i a_i^2} \leq \Sigma_i |a_i|$ for any real numbers $a_i$ and orthonormal vectors u.

According to an exemplary embodiment of the present disclosure, an Ark-L method is an approximation method to determine a random walk graph kernel on node labeled graphs. As discussed above, Ark-L addresses the cases (c) and (d) in FIG. 3.

As described above, the weight matrix W for node labeled graphs can be constructed by zeroing out rows of the Kronecker products of normalized or unnormalized matrices. More particularly, given the normalized or unnormalized adjacency matrices $W_1$ and $W_2$ of $G_1$ and $G_2$, respectively, the weight matrix W can be given by:

$$W = \tilde{L}(W_1^T \otimes W_2^T).$$

where $\tilde{L}$ is a diagonal matrix whose $(i,i)^{th}$ element is 0 if the $i^{th}$ row of $(W_1^T \otimes W_2^T)$ is zeroed out due to label inconsistency, or 1 otherwise. Let $L_1^{(j)}$ be a diagonal matrix whose $i^{th}$ element is 1 if the node i of the graph $G_1$ has the label j, and 0 otherwise. $L_2^{(j)}$ can be defined similarly for the graph $G_2$. Then, $\tilde{L}$ can be expressed by the sums of Kronecker products:

$$\tilde{L} = \sum_{j=1}^{d_n} L_1^{(j)} \otimes L_2^{(j)}$$

where $d_n$ is the number of distinct node labels.

An exemplary approximation method Ark-L for a random walk kernel on node labeled graphs is given in Algorithm 3, FIG. 6. Here, assume that $W_1$ and $W_2$ can be either row-normalized or unnormalized adjacency matrix of $G_1$ and $G_2$, respectively.

The Algorithm 3 for Ark-L gives the approximate random walk kernel:

$$\hat{k}(G_1, G_2) = q^T(I - c\tilde{W})^{-1}p, \quad \text{Eq. (7)}$$

where $\tilde{W} = \tilde{L}W_r$, and $W_r$ is the r-approximation of $W_1 \otimes W_2$.

As a proof of Algorithm 3: Let $W_1^T = U_1\Lambda_1 V_1^T$ and $W_2^T = U_2\Lambda_2 V_2^T$ be the top r singular value decompositions of $W_1^T$ and $W_2^T$. From the standard result of linear algebra, $$\hat{W} = (U_1 \otimes U_2)(\Lambda_1 \otimes \Lambda_2)(V_1^T \otimes V_2^T)$$

is a singular value decomposition. The $\hat{W}$ satisfies $\|W-\hat{W}\|_F \leq \min_{Z|rank(Z)=r}\|W-Z\|_F$ since the diagonal elements of the matrix $\Lambda_1 \otimes \Lambda_2$ contain top r largest eigenvalues of $A_1 \otimes A_2$.

Thus, $$\|q^T\|_2 \leq \|q^T\|_1 = 1,$$

$$\|p\|_2 \leq \|p\|_1 = 1, \text{ and}$$

$$\|\Sigma_i a_i u_i u_i^T\|_F = \sqrt{tr(\Sigma_i a_i^2 u_i u_i^T)} = \sqrt{\Sigma_i a_i^2 \cdot tr(u_i u_i^T)} = \sqrt{\Sigma_i a_i^2} \leq \Sigma_i |a_i|$$

where the second equality comes from the Sherman-Morrison Lemma.

Referring to the time and the space complexities of Algorithm 3, note that the time complexity $O(d_n^2 r^4 + nr + r^6)$ of Ark-L is smaller than the best exact algorithm's complexity $O(m^2 i_F)$ since $n \gg r$ and $n \gg d_n$.

More particularly, the time complexity of Ark-L takes $O(d_n n^2 r^4 + mr + r^6)$ time. Here, the top r decompositions in lines 1 and 2 cost $O(mr)$. Determining $\tilde{\Lambda}$ in line 3 takes $(d_n n^2 r^4 + r^6)$. Determining lines 4, 5 and 6 takes $O(d_n nr + d_b r^4 + r^4)$.

Further, the space complexity of Ark-L uses $O(m+n^2 r^2)$ space. Here, the storage of $W_1$ and $W_2$ uses $O(m)$ space. The top r decompositions in lines 1 and 2 use $O(nr)$. Lines 5 to 8 use $O(n^2 r^2)$ space, thus making the total space complexity $O(m+n^2 r^2)$.

Experimental Data Follows.

The exact methods, both the conjugate gradient and the fixed point iterations have been run, where the one with a smaller running time were chosen. The graphs in Table 1 have been used with the following details: WWW-Barabasi—a Web graph snapshot of an educational domain; HEP-TH—a citation network in the area of theoretical high energy physics; and AS-Oregon—a router connection graph.

TABLE 1

| Name | Nodes | Edges |
| --- | --- | --- |
| WWW-Barabasi | 325,729 | 2,207,671 |
| HEP-TH | 27,400 | 704,036 |
| AS-Oregon | 13,579 | 74,896 |

A decay factor c=0.1 was used for Ark-U and Ark-L, and c=0.0001 was used for Ark-U+ so that the fixed point iterations method converge. All the experiments were performed using a Linux machine with 48 GB memory, and quad-core AMD 2400 MHz central processing units (CPUs).

Figure 7:
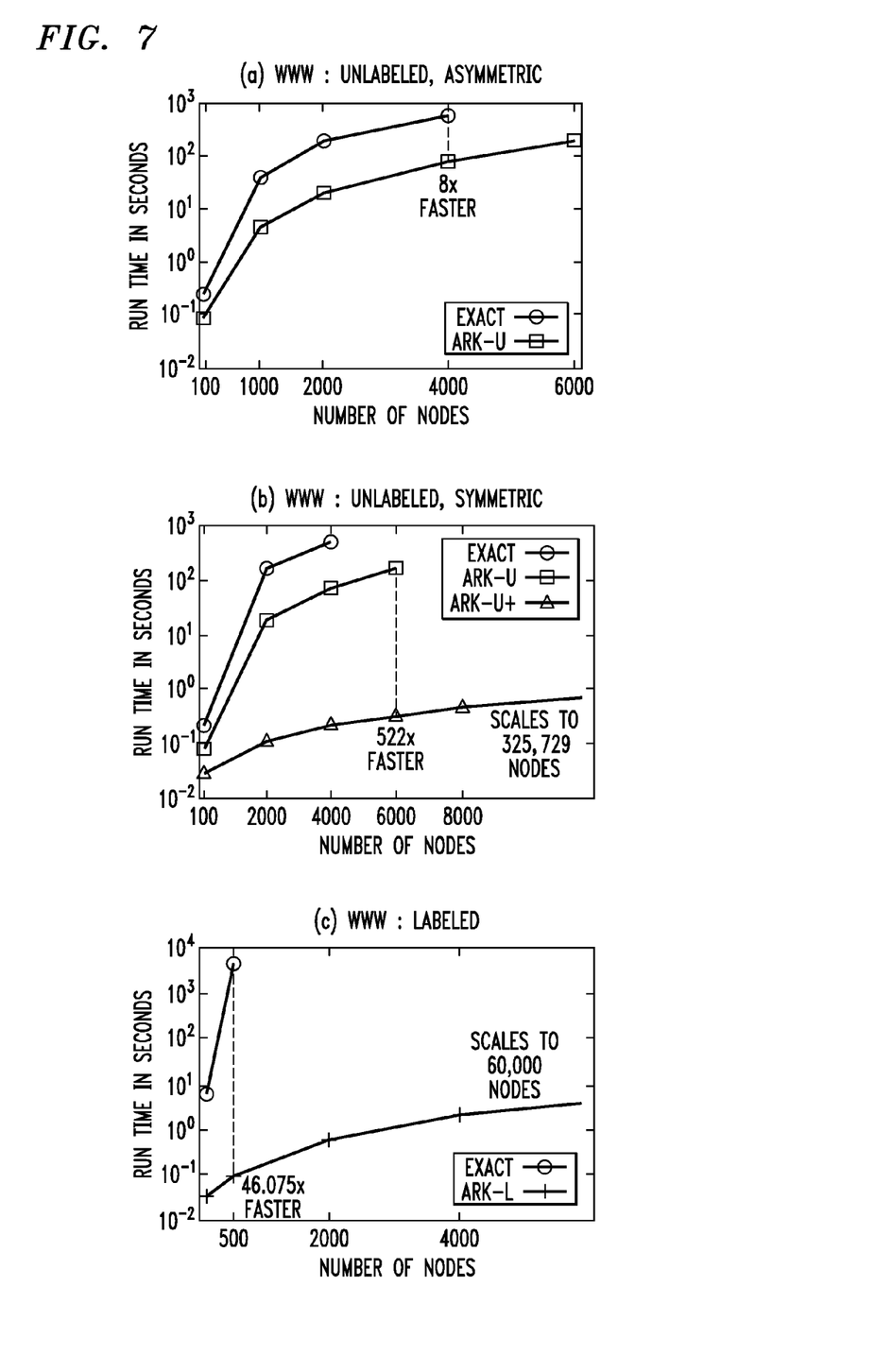
FIG. 7 shows the running time comparison of different methods according to an embodiment of the present disclosure.

Referring to scalability, for each graph, the principal sub matrices (=upper, left part of the adjacency matrix) of different lengths were extracted, and the graph kernel was determined using the two copies of the extracted sub graph. FIG. 7 shows the running time comparison of our approximation vs. exact methods for real world graphs.

In the first column of FIG. 7, examples (a), (d) and (g), Ark-U is compared against the exact method on unlabeled, asymmetric graphs. Note that for all the graphs, Ark-U is about 6 times to 11 times faster than the exact method. The exact method is not plotted for all the number of nodes since it failed with the 'out of memory' error.

In the second column of FIG. 7, examples (b), (e) and (h), Ark-U+ is compared against the exact method and Ark-U on unlabeled, symmetric graphs. Note that for all the graphs, Ark-U+ is about 389 times to 522 times faster than the exact and Ark-U method. The exact and Ark-U method is not plotted for all the number of nodes since they failed with the 'out of memory' error.

In the third column of FIG. 7, examples (c), (f) and (i), Ark-L is compared against the exact method. Note that the plots for exact method have been omitted beyond 500 data points. According to the data, Ark-L is about 695 times to 97,865 times faster than the exact method.

The accuracy of Ark can be defined by the relative error of an approximation with regard to the exact kernel:

$$\text{accuracy} = \frac{|\hat{k}(G_1, G_2) - k(G_1, G_2)|}{k(G_1, G_2)}.$$

FIG. 8 shows the accuracy of different exemplary methods with respect to the number of nodes, wherein the number of eigenvalues set to 6. Note that for all the graphs, Ark gives more than 90% accuracies. Note also that only top 6 eigenvalues for a 2,000 node graph resulted in more than 91.3% accuracies.

FIG. 9 shows the accuracy of different exemplary methods with respect to the number of eigenvalues, the number of nodes to has been set to 500. Note that for all the graphs, Ark gives more than 90% accuracies. Note also that increasing the number of eigenvalues increase the accuracy.

Figure 2B:
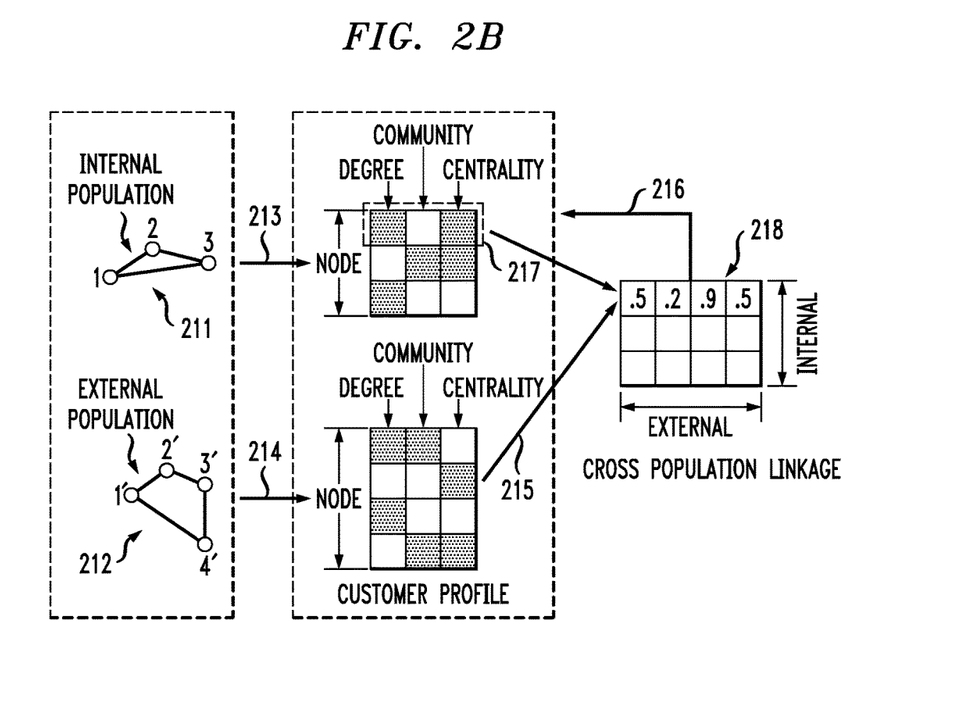
FIG. 2B shows an exemplary method for building a soft correspondence between node sets of respective graphs according to an embodiment of the present disclosure.

Referring now to FIG. 2B; features of an input graph can be used as an approximate representation, and the features of two or more graphs can be used to infer a soft correspondence between the graphs. Soft correspondence refers to the case where a node from one graph corresponds to each node from another graph with a respective weight (see for example, correspondence matrix 218 in FIG. 2B).

Exemplary implementations of the soft correspondence include de-anonymization in the context network security for linking of a user to a network address, social network analysis, prediction of disease given a set of medical records (e.g., to find similar patients), and data analysis (e.g., given n graphs, finding an n×n graph similarity matrix, which can be fed into a kernel-based data analytic technique for clustering, classification, etc.). That is, FIG. 2B can be considered a representation of an additional exemplary method for determining a kernel.

According to an exemplary embodiment of the present disclosure and referring to FIG. 2B, a method for determining a soft correspondence between a first node set of a first graph 211 and a second node set of a second graph 212 includes building a feature representation for each of the first graph and the second graph 213 and 214 respectively, and inferring the soft correspondence between the first node set and the second node set based on the feature representations 215.

According to an exemplary embodiment of the present disclosure, a set of graph features on the node-level can be used as an approximate representation of the graphs, that is, to build a feature representation. These graph features can include a degree, a community, and a centrality. The degree can refer to a number of neighbors of a given node. The community can refer to community/cluster membership. The community/cluster membership can indicate which community/cluster the corresponding node belongs to. The centrality can refer to a relative importance measure of the corresponding node. The centrality can have different definitions, including degree centrality, betweenness centrality, flow-based centralities, etc. These graph features can be used as an approximate representation of the graph. The approximate representation can be used to infer the soft correspondence. Further, the dependency in the objective function can be decoupled, and the original n-to-n matching problem is converted to 1-to-n matching problems. Here, a projective gradient descent method can be used to solve each of the 1-to-n matching problems.

More particularly, given the input graphs A1 and A2 (211 and 212), where A1: n1×n1; and A2: n2×n2, the graphs can be converted into a feature representation at 213 and 214, where feature representation F1: n1×d1; and feature representation F2: n2×d2. That is, in FIG. 2B, each row, e.g., 217, corresponds to a different node in the graph.

A soft correspondence matrix C: n1×n2 can be inferred at 215 from the feature representations F1 and F2. For example, $$\underset{C}{\text{ARGMIN}} \|F_1 - CF_2\|_F^2 \quad \text{Eq. 1}$$
$$0 \le C(i,j) \le 1;$$
$$\text{Subject to: } \sum_j C(i,j) = 1 \text{ (for } i = 1, \ldots, n_1\text{)}$$

and (for $i = 1, \ldots, n_1$)

$$\underset{C(i,:)}{\text{ARGMIN}} \|F_1(i,:) - C(i,:)F_2\|_F^2 \quad \text{Eq. 2}$$
$$0 \le C(i,j) \le 1;$$
$$\text{Subject to: } \sum_j C(i,j) = 1$$

The Equation 2 can be solved by a projective gradient descent. Gradient information can be expressed as $\|F_1(i,:) - C(i,:)F_2\|_F^2$ w.r.t. $C(i,:)$. That is, the method iterates at 216. The projective gradient descent can further incorporate side-information. This side-information can include constraints such as, $i_1$ must link to $i_2$; $i_1$ cannot link to $i_2$, is more likely to link to $i_2$, than to $j_2$, etc.

Further, in resultant a cross population correspondence matrix 218, the features of a given node of the first graph (e.g., internal population) are represented in a respective column and the features of a given node of the second graph (e.g., external population) are represented in a respective row.

In the context of an exemplary implementation, an internal customer population (e.g., all the customers of a financial institute) can be linked to external open-social media accounts, for example, to create a targeted advertisement/marketing program for the internal customers based on activities in the open-social media. The correspondence between the internal customers, e.g., graph 211, and the corresponding external open social media accounts, e.g., graph 212, can be built by building a profile for each internal customer at 213, crawling and building a profile for each external account at 214, and inferring a soft correspondence between two customer populations at 215.

To build a profile for each internal customer, the structural characteristics for each internal customer can be constructed, wherein the profile can be augmented with zero or more non-structural characteristics for each customer. The structural characteristics for each internal customer can include, for example, a degree of the customer from the internal social network, the community-membership of the customer inferred from the internal social network, the centrality of the customer implied from the internal social network, etc.

To infer the soft correspondence between two populations, the soft correspondence for an arbitrary participant can be inferred from a first population with any participant of a second population. Inferring the soft correspondence for an arbitrary participant from the first population with any participant of the second population can include initializing the correspondence between the participant with any participant of the second population, updating the correspondence strength according to the gradient information, and adjusting/projecting an updated soft correspondence to a feasible region/area. Here, the soft correspondence can include an n1×n2 non-negative table, with each entry being the likelihood of the two corresponding participants being the same.

The n1×n2 non-negative table 218 of the soft correspondence can be used as a random walk graph kernel for traversing the input graphs 211 and 212.

The methodologies of embodiments of the disclosure may be particularly well-suited for use in an electronic device or alternative system. Accordingly, embodiments of the present disclosure may take the form of an entirely hardware embodiment or an embodiment combining software and hardware aspects that may all generally be referred to herein as a "processor", "circuit," "module" or "system." Furthermore, embodiments of the present disclosure may take the form of a computer program product embodied in one or more computer readable medium(s) having computer readable program code stored thereon.

Figure 2C:
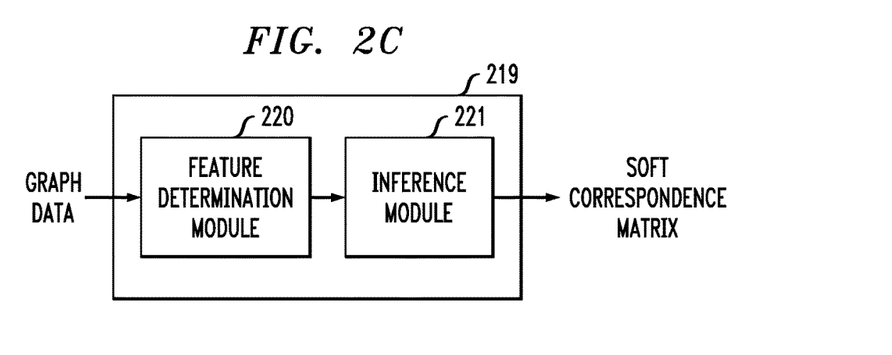
FIG. 2C shows an exemplary system for determining a soft correspondence between node sets of respective graphs according to an embodiment of the present disclosure.

Furthermore, it should be noted that any of the methods described herein can include an additional step of providing a system (see for example, FIG. 2C: 219) comprising distinct software modules embodied on one or more tangible computer readable storage media. All the modules (or any subset thereof) can be on the same medium, or each can be on a different medium, for example. The modules can include any or all of the components shown in the figures. In a non-limiting example, the modules include a first module that builds a feature representation for each of the first graph and the second graph (see for example, FIG. 2C: 220), a second module that infers the soft correspondence between the first node set and the second node set based on the feature representations (see for example, FIG. 2C: 221), wherein a soft correspondence matrix is indicative of the similarity between the first and second graphs. Further, a computer program product can include a tangible computer-readable recordable storage medium with code adapted to be executed to carry out one or more method steps described herein, including the provision of the system with the distinct software modules.

Any combination of one or more computer usable or computer readable medium(s) may be utilized. The computer-usable or computer-readable medium may be a computer readable storage medium. A computer readable storage medium may be, for example but not limited to, an electronic, magnetic, optical, electromagnetic, infrared, or semiconductor system, apparatus, device, or any suitable combination of the foregoing. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus or device.

Computer program code for carrying out operations of embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present disclosure are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions.

These computer program instructions may be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Figure 10:
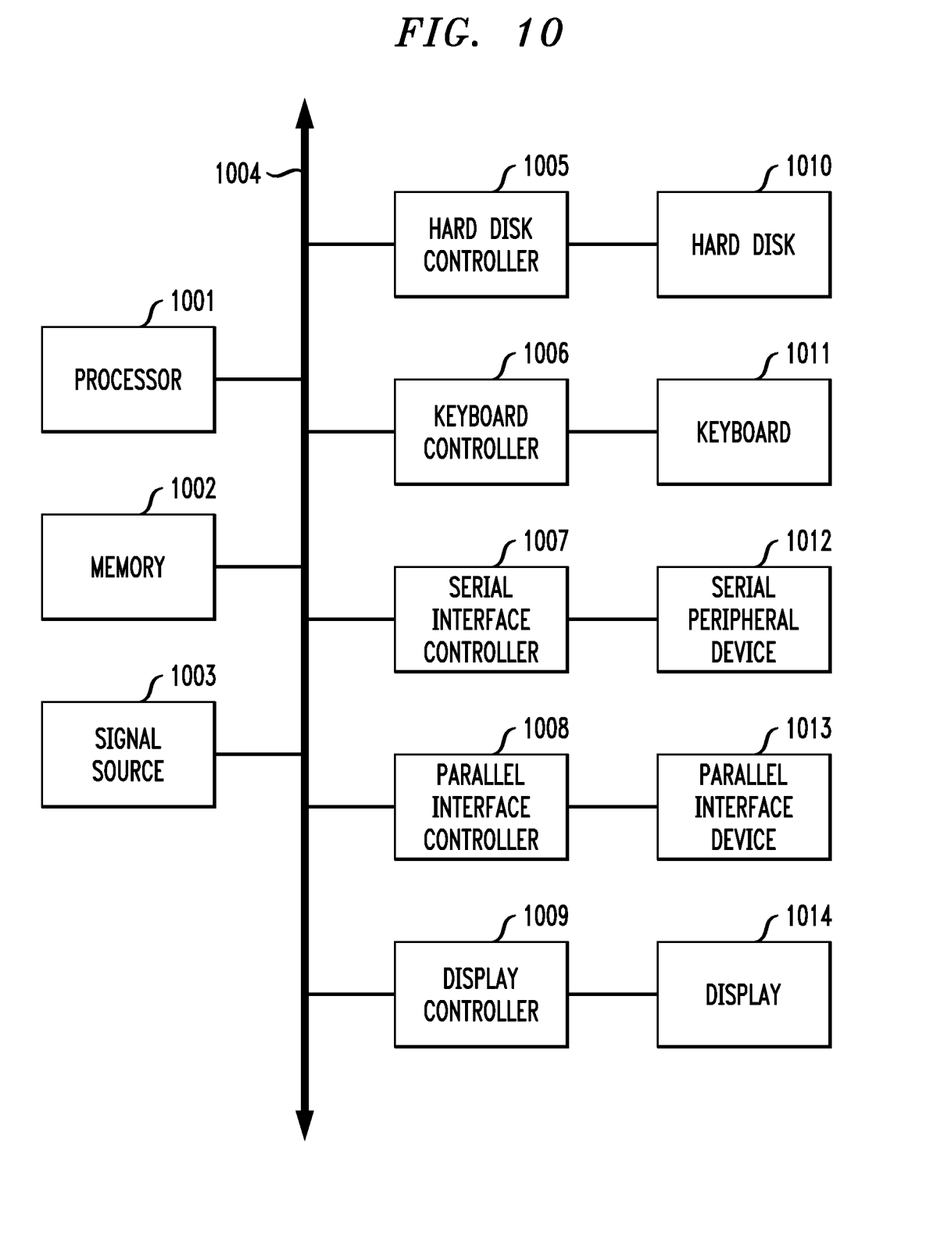
FIG. 10 is a block diagram depicting an exemplary computer system for determining a kernel according to an embodiment of the present disclosure.

For example, FIG. 10 is a block diagram depicting an exemplary computer system for detecting top-K simple shortest paths in a graph according to an embodiment of the present disclosure. The computer system shown in FIG. 10 includes a processor 1001, memory 1002, signal source 1003, system bus 1004, Hard Drive (HD) controller 1005, keyboard controller 1006, serial interface controller 1007, parallel interface controller 1008, display controller 1009, hard disk 1010, keyboard 1011, serial peripheral device 1012, parallel peripheral device 1013, and display 1014.

In these components, the processor 1001, memory 1002, signal source 1003, HD controller 1005, keyboard controller 1006, serial interface controller 1007, parallel interface controller 1008, display controller 1009 are connected to the system bus 1004. The hard disk 1010 is connected to the HD controller 1005. The keyboard 1011 is connected to the keyboard controller 1006. The serial peripheral device 1012 is connected to the serial interface controller 1007. The parallel peripheral device 1013 is connected to the parallel interface controller 1008. The display 1014 is connected to the display controller 1009.

In different applications, some of the components shown in FIG. 10 can be omitted. The whole system shown in FIG. 10 is controlled by computer readable instructions, which are generally stored in the hard disk 1010, EPROM or other non-volatile storage such as software. The software can be downloaded from a network (not shown in the figures), stored in the hard disk 1010. Alternatively, a software downloaded from a network can be loaded into the memory 1002 and executed by the processor 1001 so as to complete the function determined by the software.

The processor 1001 may be configured to perform one or more methodologies described in the present disclosure, illustrative embodiments of which are shown in the above figures and described herein. Embodiments of the present disclosure can be implemented as a routine that is stored in memory 1002 and executed by the processor 1001 to process the signal from the signal source 1003. As such, the computer system is a general-purpose computer system that becomes a specific purpose computer system when executing the routine of the present disclosure.

Although the computer system described in FIG. 10 can support methods according to the present disclosure, this system is only one example of a computer system. Those skilled of the art should understand that other computer system designs can be used to implement the present invention.

It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to a multi-core processor that contains multiple processing cores in a processor or more than one processing device, and that various elements associated with a processing device may be shared by other processing devices.

The term "memory" as used herein is intended to include memory and other computer-readable media associated with a processor or CPU, such as, for example, random access memory (RAM), read only memory (ROM), fixed storage media (e.g., a hard drive), removable storage media (e.g., a diskette), flash memory, etc. Furthermore, the term "I/O circuitry" as used herein is intended to include, for example, one or more input devices (e.g., keyboard, mouse, etc.) for entering data to the processor, and/or one or more output devices (e.g., printer, monitor, etc.) for presenting the results associated with the processor.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although illustrative embodiments of the present disclosure have been described herein with reference to the accompanying drawings, it is to be understood that the disclosure is not limited to those precise embodiments, and that various other changes and modifications may be made therein by one skilled in the art without departing from the scope of the appended claims.

What is claimed is:

1. A method of operating a computer system to store in a memory an approximation of a random walk kernel given a first node set of a first graph and a second node set of a second graph, wherein a capability of said computer system to calculate said random walk kernel is constrained by said memory, the method comprising:
   building a feature representation for each of said first graph and said second graph, said feature representations each comprising a degree for each node of a respective one of said first graph and said second graph, a community-membership for said each node of said respective one of said first graph and said second graph, and a centrality for said each node of said respective one of said first graph and said second graph;
   calculating, from said feature representations, for each node of said first node set, a likelihood of matching each node of said second node set; and
   generating, and storing to said memory, a cross population matrix approximating said random walk kernel, wherein said cross population matrix comprises a plurality of columns and a plurality of rows, wherein each node of said first node set is represented in each cell of a respective one of said columns and each node of said second node set is represented in each cell of a respective one of said rows, wherein a value contained in each cell of said cross population matrix corresponds to a given node of said first node set and a given node of said second node set and gives a corresponding one of said likelihoods of matching;
   wherein building said feature representation for each of said first graph and said second graph further comprises:
      determining the degree for each node of said respective graph;
      inferring the community-membership for said each node of said respective graph, wherein the community-membership indicates a given node's inclusion in a cluster within said respective graph; and
      determining the centrality for said each node of said respective graph; and
   wherein calculating, from said feature representations, for each node of said first node set, said likelihood of matching each node of said second node set further comprises:
      initializing a correspondence between a first node of said first node set and any node of said second node set;
      adjusting said correspondence according to gradient information; and
      projecting an updated correspondence to a feasible region.

2. The method of claim 1, wherein said cross population matrix comprises an $n_1 \times n_2$ non-negative table, wherein an entry of said $n_1 \times n_2$ non-negative table is said likelihood that said given node of said first node set and said given node of said second node set match.

3. The method of claim 1, wherein said nodes of said first graph and said second graph correspond to data associated with a plurality of users and said likelihood reveals an identity of a user associated with said given node of said first node set based on a known identity of said user associated with said given node of said second node set.

4. The method of claim 1, wherein said nodes of said first graph and said second graph correspond to data associated with a plurality of diseases and said correspondence reveals a disease associated with said given node of said first node set based on a known disease associated with said given node of said second node set.

5. A computer program product for operating a computer system to store in a memory an approximation of a random walk kernel given a first node set of a first graph and a second node set of a second graph, wherein a capability of said computer system to calculate said random walk kernel is constrained by said memory, the computer program product comprising:
   a non-transitory computer readable storage medium having computer readable program code embodied therewith, the computer readable program code comprising:
   computer readable program code configured to build a feature representation for each of said first graph and said second graph, said feature representations each comprising a degree for each node of a respective one of said first graph and said second graph, a community-membership for said each node of said respective one of said first graph and said second graph, and a centrality for said each node of said respective one of said first graph and said second graph;
   computer readable program code configured to calculate, from said feature representations, for each node of said first node set, a likelihood of matching each node of said second node set; and
   computer readable program code configured to generate and store in said memory a cross population matrix approximating said random walk kernel, wherein said cross population matrix comprises a plurality of columns and a plurality of rows, wherein each node of said first node set is represented in each cell of a respective one of said columns and each node of said second node set is represented in each cell of a respective one of said rows, wherein a value contained in each cell of said cross population matrix corresponds to a given node of said first node set and a given node of said second node set and gives a corresponding one of said likelihoods of matching;
   wherein said computer readable program code configured to build said feature representation for each of said first graph and said second graph further comprises:
      computer readable program code configured to determine the degree for each node of said respective graph;
      computer readable program code configured to infer the community-membership for said each node of said respective graph, wherein the community-membership indicates a given node's inclusion in a cluster within said respective graph; and
      computer readable program code configured to determine the centrality for said each node of said respective graph; and
   wherein said computer readable program code configured to calculate, from said feature representations, for each node of said first node set, said likelihood of matching each node of said second node set further comprises:
      computer readable program code configured to initialize a correspondence between a first node of said first node set and any node of said second node set;

computer readable program code configured to adjust said correspondence-according to gradient information; and computer readable program code configured to project an updated correspondence to a feasible region.

6. The computer program product of claim 5, wherein said cross population matrix comprises an $n_1 \times n_2$ non-negative table, wherein an entry of said $n_1 \times n_2$ non-negative table is said likelihood that said given node of said first node set and said given node of said second node set match.

* * * * *